ANALOGUE COMPUTER

Filed Feb. 21, 1950 3 Sheets-Sheet 1

INVENTOR
CONRAD H. HOEPPNER
BY Elmer J. Gorn
ATTORNEY

May 11, 1954 C. H. HOEPPNER 2,678,425

ANALOGUE COMPUTER

Filed Feb. 21, 1950 3 Sheets-Sheet 2

INVENTOR
CONRAD H. HOEPPNER
BY Elmer J. Gorn
ATTORNEY

May 11, 1954 C. H. HOEPPNER 2,678,425

ANALOGUE COMPUTER

Filed Feb. 21, 1950 3 Sheets-Sheet 3

INVENTOR
CONRAD H. HOEPPNER
BY Elmer J. Gorn
ATTORNEY

Patented May 11, 1954 2,678,425

UNITED STATES PATENT OFFICE 2,678,425

ANALOGUE COMPUTER

Conrad H. Hoeppner, Waltham, Mass., assignor to Raytheon Manufacturing Company, Newton, Mass., a corporation of Delaware Application February 21, 1950, Serial No. 145,478

11 Claims. (Cl. 332—9)

This invention relates to analogue computers, and more particularly to a type of analogue computer useful for computing linear data from data containing known non-linearities.

In telemetering intelligence devices, the signal in nearly all cases is to some extent non-linear. These non-linearities may be due to the measuring device or the signal transmission system with the result that information read or recorded directly from a telemetering system must be corrected by means of calibration curves before it is presented in useable form. To date, this calibration work has been done by manual labor by comparing the recorded data with a calibration curve and then again recording or plotting the corrected data. Such a procedure is slow and costly, particularly where there are many thousands of separate pieces of information to be so corrected.

This invention discloses an apparatus which automatically compares incoming data with a calibration curve and corrects said data prior to the initial recording thereof. This eliminates the correction and replotting of the data by hand. One means for producing the calibration curve comprises a function synthesizer which continuously generates a wave form, conforming to the calibration curve, against which the incoming data is compared. The function synthesizer comprises a time delay line having its input connected to a source of pulses. At spaced intervals along said delay line are connected the inputs to a plurality of cathode follower amplifiers such that, when a pulse is introduced into one end of the delay line, it travels down the line and successively pulses the inputs of each of the cathode followers. The cathode load of each of the cathode followers comprises an adjustable potentiometer, the variable taps of which are connected to a common output signal channel. Thus, it may be seen that, when a pulse travels along the delay line successively triggering the cathode followers, successive pulses are introduced into the output channel, the magnitude of which is dependent upon the settings of the variable taps of the potentiometers. Since the time delay interval between adjacent cathode followers is made substantially equal to the length of the pulse traveling down the delay line, the signal output to the common output channel will be a substantially continuous wave whose amplitude varies successively in accordance with the settings of the cathode followers of the potentiometers. By adjusting said potentiometers, a good approximation of any desired output wave form may be synthesized.

This synthesized wave form may be compared with an incoming signal for correction therewith in any one of several ways. In a system used for correcting intelligence being transmitted by pulse position modulation, there may be used, for example, a synchronizing pulse whose cyclical position remains fixed, and an intelligence pulse whose time position varies relative to the synchronizing pulse. The synchronizing pulse may be used to initiate a pulse forming circuit which starts a pulse down the function synthesizer delay line. The synchronizing pulse may also be used to initiate the start of a saw-tooth generator. The output of the function synthesizer is then mixed with the output of the saw-tooth generator to form a modified saw-tooth wave which is applied at the deflection plates of a cathode ray tube. The intelligence pulse is applied to the control grid of the cathode ray tube in the form of a positive pip such that the cathode ray tube has a spot thereon when the intelligence pip is applied to the control grid, but during the remainder of the time is blank. It may be seen that the intelligence pip will arrive after the initiation of the saw-tooth sweep, and the bright spot will appear at some position lying in a line perpendicular to the deflection plates of the tube on the face thereof. In the absence of a signal from the function synthesizer, the position of this spot will vary as a linear function of the difference in time between the synchronizing pulse and the intelligence pulse of the incoming signal. However, by superimposing a wave from the function synthesizer on the saw-tooth sweep wave, the position of the spot on the face of the tube may be changed by a certain predetermined amount dependent upon the output of the function synthesizer at the particular instant that the intelligence pulse arrives at the control grid of the cathode ray tube. By adjusting the output of each of the cathode follower stages of the function synthesizer, any desired position correction may be applied to the spot on the cathode ray tube at any desired time position of the intelligence pulse relative to the synchronizing pulse. A photograph film may then be placed in proximity with the cathode ray tube and continuously moved relative thereto, thereby producing a continuous record of the position of the spots on the cathode ray tube. The position of these spots having been corrected by the wave generated by the function synthesizer, the information recorded on the film will be accurate and linear.

Another species of the device may be used to correct information occurring in the form of continuous signal waves. In this device, a master oscillator periodically triggers a pulse generator which feeds pulses to the function synthesizer and also initiates the generation of a saw-tooth wave form by a saw-tooth generator. The output of the function synthesizer and the saw-tooth generator are mixed to produce a wave form comprising the saw-tooth wave form having the correction wave form generated by the function synthesizer superimposed thereon. This wave form is then compared with the intelligence signal by a coincidence gate which produces a pulse whenever the intelligence signal is equal in amplitude to the calibrating wave form. The output of the coincidence gate is used to terminate the generation of a rectangular pulse from a saw-tooth gate. The initiation of the rectangular pulse generation by the saw-tooth gate is governed by a synchronizing pulse from the master oscillator. The result is that the length of the pulse generated by the saw-tooth gate varies as a function of the amplitude of the input signal and the correction introduced by the function synthesizer. The output of the saw-tooth gate is used to drive a saw-tooth generator which produces a saw-tooth wave form whose amplitude varies directly with the length of the input pulse. The amplitude of the saw-tooth wave is measured by a peak riding cathode follower, the output of which is applied to the deflection plates of a cathode ray tube. The cathode ray beam continuously strikes the screen to form a spot whose position moves as a function of the corrected signal. Thus, it may be seen that information, which contains known errors having a non-linear relation to said information, may be automatically corrected during the transmission thereof.

Other objects and advantages of this invention will be apparent as the description thereof progresses, reference being had to the accompanying drawings wherein.

Figure 1:
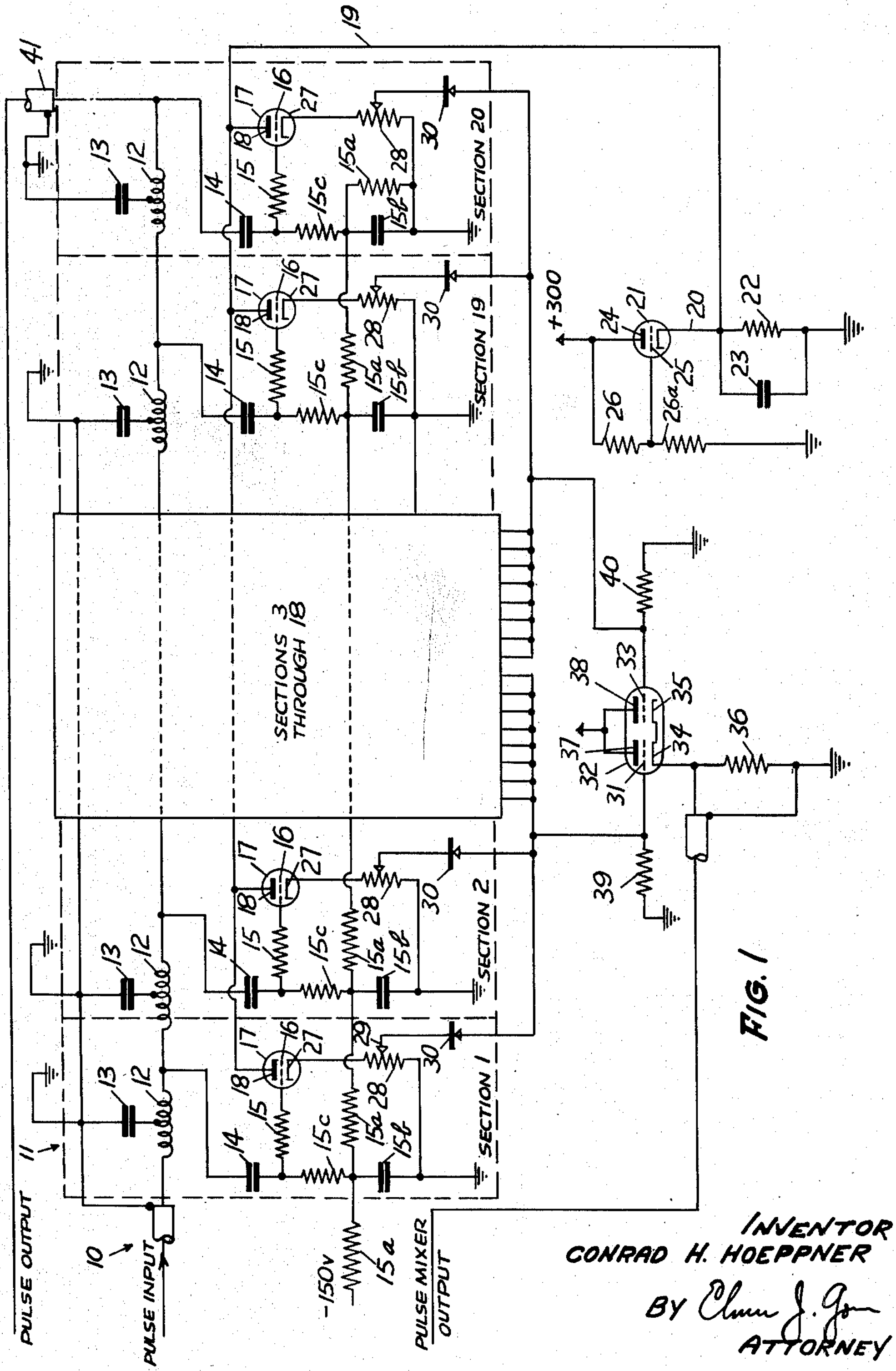
Fig. 1 illustrates a circuit diagram of a function synthesizer which may be used in the utilization of this invention.

Referring now to Fig. 1, which illustrates the function synthesizer, there is shown a pulse input 10 which may be, for example, a coaxial cable in order to preserve the sharpness of the pulse during transmission from the pulse generation device to the input. The pulse input 10 is connected to a delay line network 11 having a plurality of sections. Each section comprises a center tapped choke 12 connected in series with the input 10 and the input to the next section. The center tap of the choke 12 is connected through a condenser 13 to ground and thereby to the outside shield of the coaxial input 10. Each section produces a time delay of, for example, one microsecond such that, if twenty sections, for example, as shown here, are used, the overall delay of the time delay network will be twenty microseconds, each section being identical with the first-described section and having, respectively, a choke 12 and a condenser 13. Each of the junctions between the chokes 12 is connected, respectively, through condensers 14 and grid current-limiting resistors 15 to the grids 16 of twenty cathode followers 17.

The plates 18 of the cathode followers 17 are all connected to a common voltage bus 19 which is connected to the cathode 20 of a voltage stabilizing tube 21. Cathode 20 is connected to ground through a bleeder resistor 22 in parallel with a filter condenser 23. The plate 24 of tube 21 is connected directly to a source of positive direct potential of, for example, 300 volts. The grid 25 of tube 21 is connected to a junction between two resistors 26 and 26*a*, the other end of resistor 26*a* being connected to ground, and the other end of resistor 26 being connected to plate 24. Thus, it may be seen that, due to the cathode follower action, the potential of cathode 20 and, therefore, the potential of all of the plates 18 will remain at substantially the potential of grid 25. Rapid fluctuations in the ground and bus 19 will be absorbed by filter condenser 23, thereby preventing the feeding of pulses into the high voltage supply.

Each of the cathodes 27 of cathode followers 17 is connected to one end of a separate variable potentiometer 28, the other ends of said potentiometer being connected to ground. Each variable tap 29 of each potentiometer 28, which may be of the helipot type, is connected through a separate crystal rectifier 30 to one of a pair of common grids of a cathode follower pulse mixer stage 32.

The grid bias voltage for grids 16 is supplied as follows. A voltage divider network comprising twenty-one resistors 15*a* in series is connected between a negative voltage source of, for example, 150 volts and ground. The junctions between resistors 15*a* are connected to ground through condensers 15*b* and to the junction between condensers 14 and resistors 15 through grid load resistors 15*c*. The values of resistors 15*a* are such that bias voltages on the grids 16 vary from, for example, 13 volts for section one to 11 volts for section twenty. Thus, as the pulse travels down delay line 11 and becomes slightly attenuated thereby, the gains of the sections increase to substantially compensate for the attenuation so that all the sections of the synthesizer will produce substantially equal outputs for similar settings of potentiometers 28.

As shown here, the outputs of the helipots of sections one through ten are connected to a common grid 31 of one section of the cathode follower stage 32, while the outputs of sections eleven through twenty are connected to another grid 33 of a second section of cathode follower stage 32. The cathodes 34 and 35 of both sections of stage 32 are connected together and to ground through a cathode load resistor 36 across which the output signal is developed and fed, for example, by a coaxial cable to a utilization circuit to be described presently. The plates 37 and 38 of both sections are connected together and to a source of positive potential. The grids 31 and 33 are connected to ground through grid load resistors 39 and 40, respectively. The use of crystals 30 in the outputs between taps 29 and the common output stage 32, prevents pulses from one section of the delay line network from feeding through the common connection at grid 31 or grid 33 to other stages of the system. After a pulse has traveled down the delay line 11, it is connected to an output connection 41 comprising a coaxial cable for use in controlling other stages of the circuit to be described presently.

Figure 2:
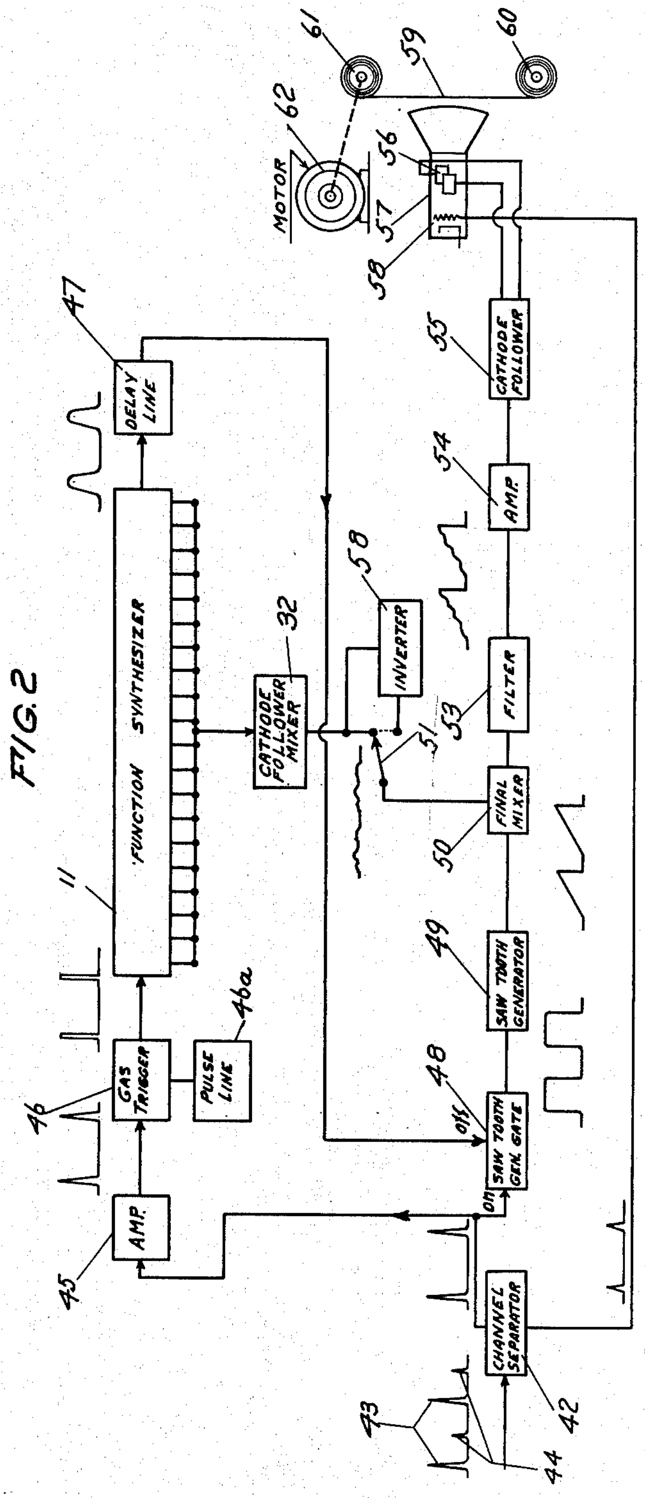
Fig. 2 illustrates a block diagram of one form of circuit which may be used with the function synthesizer of Fig. 1 to correct pulse position modulation intelligence.

Referring now to Fig. 2, there is shown an overall functional block diagram illustrating one method of use of the function synthesizer of Fig. 1. A pulse position modulation signal having intelligence to which a correction is to be applied is fed into a channel separator 42. Each signal cycle comprises two pulses, an initial or synchronizing pulse 43 and an intelligence pulse 44 which lags behind synchronizing pulse 43 by an amount which varies as a function of the intelligence being transmitted by the signal. Channel separator 42 comprises a circuit which separates the synchronizing pulses 43 from the intelligence pulses 44 and may be of any desired type as, for example, that used in the television art. The synchronizing pulses are fed from channel separator 42 through an amplifier stage 45 to a gas triggered tube 46 which discharges a pulse forming line 46a to produce a rectangular pulse having a duration of substantially one microsecond. The pulse generated by gas triggered tube 46 is fed to the function synthesizer 11 through input 10 and travels down the delay line thereof producing an output wave at the cathode follower mixer stage 32 which has a predetermined shape dependent upon the settings of the potentiometers 28.

After passing down the delay line of the function synthesizer 11, the one microsecond pulse is fed through a second delay line 47 having a delay which may be, for example, three and one-half microseconds, to a saw-tooth generator gate 48. Saw-tooth generator gate 48 may be, for example, a flip-flop multivibrator having two inputs. One input is connected to the output of the channel separator 42 which feeds the synchronizing pulses to amplifier 45. Each synchronizing pulse triggers the saw-tooth generator gate 48 initiating the generation of a pulse output therefrom. The pulse from delay line 47 is connected to the other input of the saw-tooth generator gate 48 and terminates the pulse whose generation was initiated by the pulse from the channel separator 42. The output of the saw-tooth generator gate 48, therefore, is a rectangular pulse having a duration on the order of twenty-five microseconds.

The output of the saw-tooth generator gate 48 is fed to a saw-tooth generator 49 which produces a saw-tooth wave form of the same duration as the rectangular pulses. This saw-tooth generator may be any of the well-known types which produce a linear triangular wave. The output of saw-tooth generator 49 is fed to a final mixer 50. The output of cathode follower 32 is also fed through a switch 51 to final mixer 50 where it is added to, and thereby superimposed upon, the triangular wave form produced by saw-tooth generator 49. Switch 51 allows optional connection of an inverter stage 52 into the circuit between the cathode follower and the final mixer 50. Thus, if desired, the wave form generated by the function synthesizer 11 may be inverted before being mixed with the saw-tooth wave form. The output of the final mixer 50 is fed to a filter 53 which rounds off any sharp discontinuities which may exist in the wave produced by the function synthesizer. The output of filter 53 is fed through an amplifier 54 and a cathode follower 55 to the deflection plates 56 of a cathode ray tube 57. As shown here, the cathode follower 55 feeds the horizontal deflection plates of the tube 57 such that all positions of the electron beam striking the screen of the tube 57 will lie in a horizontal line. The intelligence pulses 44 are fed from channel separator 42 to the control grid 58 of tube 57 appearing thereon in the form of positive pips. With the control grid 58 adjusted to below cutoff, the appearance of positive pips on the grid will allow electrons to flow to the screen of tube 57 producing a spot thereon. The position of the spot appearing on the screen of tube 57 will be determined by the particular time at which the intelligence pips 44 brighten the screen with respect to the particular phase relation of the wave form produced at the output of the final mixer 50.

In the absence of a correcting wave from the function synthesizer 11, the position of the spot on the screen of tube 57 will vary linearly across the face thereof as a function of the position of the pulse 44 relative to synchronizing pulse 43. By varying the linearity of the saw-tooth wave form applied to deflection plates 56, the position of the spot on the screen of tube 57 may be adjusted relative to the position of intelligence pulse 44 with respect to synchronizing pulse 43. This variation is accomplished by adjusting the potentiometers of the cathode followers 17 in the function synthesizer 11 which is being energized by the pulse from gas trigger stage 46 at the same time that intelligence pulse 44 is being applied to control grid 58.

Thus, it may be seen that, for twenty time positions of pulse 44 with respect to synchronizing pulse 43, the physical position of the spot on the screen of tube 57 may be adjusted horizontally across the face of the scope. Due to the action of filter network 53, positions between these twenty adjustment positions will tend to be interpolated toward their correct values. Thus, when the intelligence being carried by the input signal is for any reason a non-linear function of the relative position of synchronizing pulse 43 and intelligence pulse 44, and that non-linearity can be determined, for example, by calibrating measurements, a correcting wave may be produced by suitable adjustment of the potentiometers 28 of function synthesizer 11 such that the position of the spot on the cathode ray tube 57 will vary as a linear function of the intelligence.

In order to continuously record this corrected intelligence, there is provided a photograph film 59 supported on two reels 60 and 61, respectively. Reel 61 has continuous uniform rotary motion imparted thereto by means of a motor 62 such that the film 59 is drawn past the face of tube 57 in a direction perpendicular to the deflection line of the electron beam at a uniform rate. Once every cycle of the incoming wave, a spot is produced on the screen of tube 57 and recorded by film 59, the transverse position of said spot on said film being a measure of the intelligence.

For example, if a sinusoidal wave form is being transmitted by the system, the relative position of pulses 43 and 44 will vary substantially sinusoidal. However, variations from the sinusoidal pattern will occur due to non-linearities in the transmitting system. These non-linearities will be corrected due to the action of the function synthesizer 11 with the result that the position of the spot on tube 57 will vary across the face of the scope as a sinusoidal function of time. The result will be a locus of spots recorded on the film 59 which lie on a true sine wave.

Figure 4:
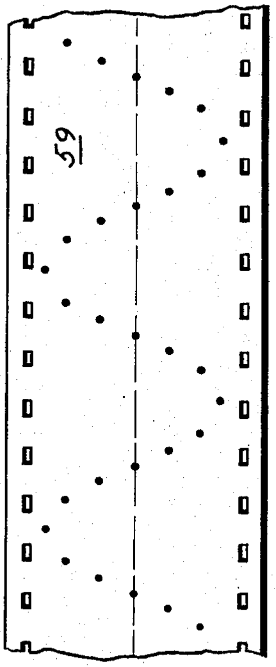
Fig. 4 illustrates a recording of a corrected intelligence signal which may be produced on a film by the device shown in Fig. 2.

In Fig. 4, there is shown a section of film 59 illustrating such a sine wave. As shown here, during each cycle of the sine wave, there are twelve cycles of the intelligence pulses 44, thereby producing twelve spots on the screen of tube 57.

Obviously, any wave form other than a sinusoid may be transferred and recorded by the system and have a suitable correction introduced thereto. Once the function synthesizer has been adjusted for the particular system to compensate for all of the non-linearities therein, any form of wave may be transmitted over said system and be recorded in its corrected form.

While a particular design of the system used at present has an input pulse frequency signal of approximately 1400 cycles per second, higher frequencies could be used. For example, since a complete correcting cycle takes approximately twenty-five microseconds, the signal pulses could arrive at the rate of approximately 40,000 cycles per second without jamming the correcting system. In addition, for still higher frequencies, the function synthesizer could be built with less delay per section, thereby decreasing the time for each correction cycle, and, as a result, increasing the maximum allowable input pulse repetition frequency.

Figure 3:
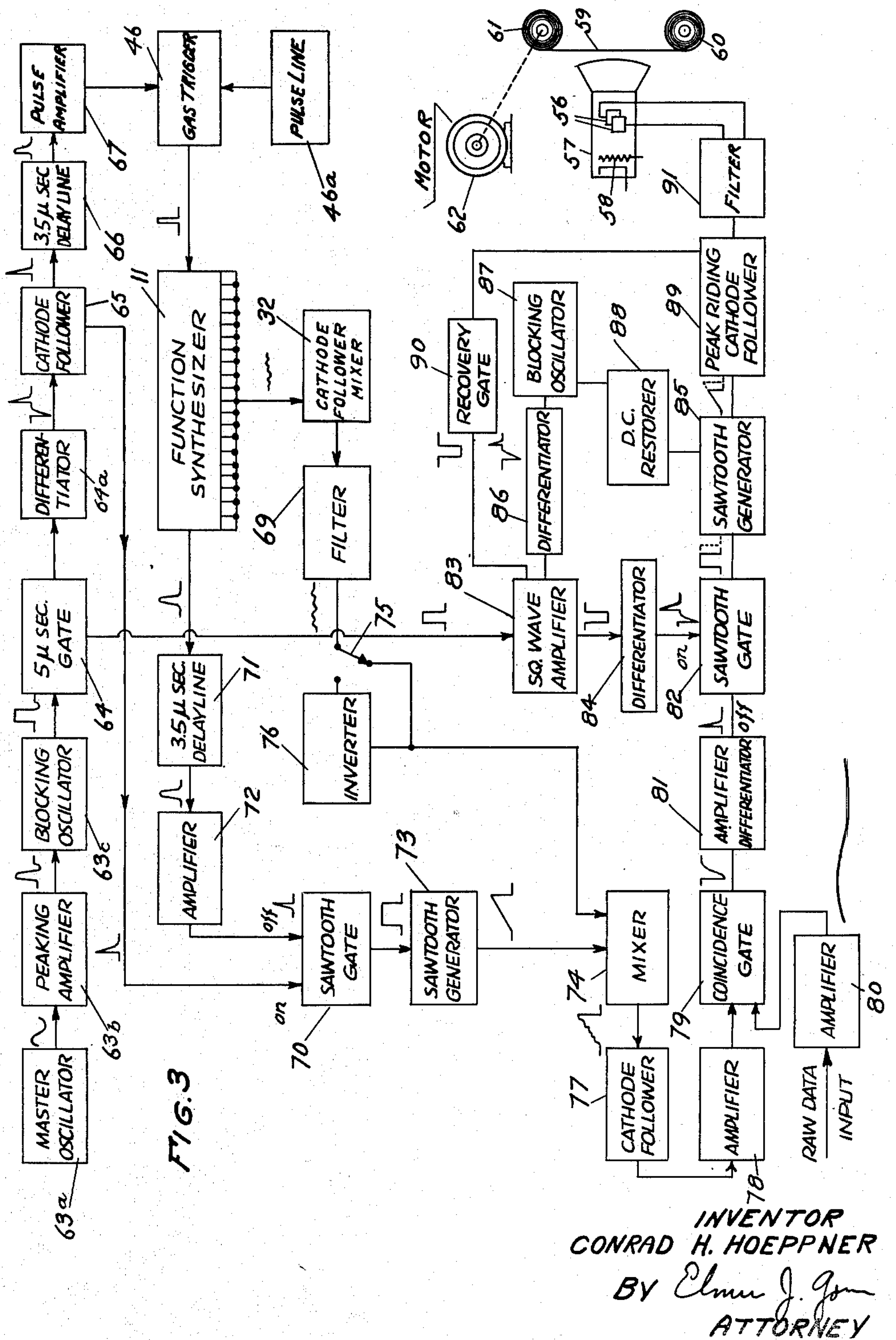
Fig. 3 illustrates a block diagram of a second circuit which may be used to correct continuous wave information.

Turning now to Fig. 3, there is shown a system utilizing a function synthesizer for correcting data appearing as a continuous wave signal which varies in amplitude. In this system, the incoming signal is sampled or measured approximately 1400 times per second and a correction introduced thereto at each measurement. The sampling rate is governed by a master oscillator 63a which may be of any well-known stable type. The output is fed to a peaking amplifier 63b which may be, for example, a standard vacuum tube amplifier having an inductive plate load which sharpens the rise of the sine wave. The output of peaking amplifier 63b is fed to a blocking oscillator 63c which may be, for example, a standard transformer coupled feed-back oscillator which is highly regenerative. The output of blocking oscillator 63c is fed to a five microsecond gate 64 which may be a standard one kick multivibrator comprising two tubes which produces a positive pulse in the plate circuit of one tube and a negative pulse in the plate circuit of the other tube, both pulses being generated simultaneously and having a duration of five microseconds. The negative five microsecond pulse is fed to a differentiator 64a which produces a negative pip followed five microseconds later by a positive pip. Both pips are fed to a cathode follower 65 which is biased near cutoff, thus eliminating the negative input pip and producing an output wave form which consists essentially of a positive pip.

The positive pip is fed through a three and one-half microsecond delay line 66 and a pulse amplifier stage 67 to a gas trigger tube 46 which discharges a pulse line 46a, thereby producing a one microsecond positive pulse output. The pulse is fed to function synthesizer 11 of the type shown in Fig. 1, and travels along the delay line producing successive outputs at the potentiometers of the cathode followers. The outputs of the potentiometers of function synthesizer 11 will feed through a common cathode follower mixer 32 and a filter network of the low-pass type 69 which eliminates sharp discontinuities in the wave generated by the function synthesizer 11.

The positive pip from cathode follower 65 is also fed to a saw-tooth gate 70 which may be a flip-flop multivibrator similar to that of gate 48 described in Fig. 2. The positive pulse of the cathode follower 65 initiates the generation of a rectangular pulse by the saw-tooth gate 70. The pulse which traveled down the delay line of function synthesizer 11 passes through a three and one-half microsecond delay line 71, and through an amplifier 72, and is then applied to saw-tooth gate 70 to terminate the generation of the rectangular pulse.

The rectangular pulse generated by the saw-tooth gate is fed to a saw-tooth generator 73 which generates a linear saw-tooth wave form. This wave form is fed to a mixer 74. The output of the function synthesizer 11 is also fed to mixer 74 through cathode follower 32, filter 69 and a switch 75, which in one position allows the signal to pass directly from filter 69 to mixer 74, and from the other position passes the signal through an inverter 76, if so desired. The output of mixer 74 comprises the saw-tooth wave form having the correction wave developed by function synthesizer 11 additively superimposed thereon similar to the output of mixer 50 in Fig. 2. This output is fed through a cathode follower 77 and an amplifier 78 to a coincidence gate 79. The raw uncorrected input data signal is also fed through an amplifier 80 to coincidence gate 79.

Coincidence gate 79 comprises a circuit which generates a pulse when the input from amplifier 78 is substantially equal to the input from amplifier 80. This circuit may be, for example, a space discharge device having a grid plate and cathode with one signal applied to the cathode, and the other signal applied to the grid, and the output taken off by a load in the plate circuit. If, for example, the saw-tooth wave applied to coincidence gate 79 is of constantly increasing amplitude, as shown here, this wave would be applied to the grid of the coincidence gate. The raw data input from amplifier 80 would be applied to the cathode. Since the input from amplifier data 80 applied to the cathode is at the beginning of each sampling cycle larger in amplitude than the saw-tooth wave from amplifier 78, the coincidence gate will be non-conductive. As the saw-tooth wave form increases in amplitude, a point will be reached where the grid voltage of the coincidence gate will approach the cathode voltage bringing the tube out of cutoff and producing a voltage output pulse in the plate circuit.

The output of coincidence gate 79 is fed to an amplifier differentiator 81 which produces an output pip corresponding to the lead-in edge of the pulse generated by the coincidence gate 79.

The output of amplifier differentiator 81 is applied to a second saw-tooth gate 82 to terminate a pulse being generated therein, said pulse having its generation initiated in the following manner The positive pulse output of five microsecond gate 64 is fed through a square wave amplifier 83 and a differentiator 84 producing a negative pip followed five microseconds later by a positive pip. The positive pip triggers on the saw-tooth gate 82 which may be a flip-flop multivibrator similar to the gate 70.

The relative cyclical position of the pulse from amplifier differentiator 81 will vary with respect to the fixed cyclical position of the pulse from differentiator 84 as a function of the amplitude of the input signal from amplifier 80, and, therefore, the output of saw-tooth gate 82 will be a rectangular pulse whose length varies as a function of the amplitude of the input signal from amplifier 80. The output from saw-tooth gate 82 is fed to a saw-tooth generator 85 which produces a triangular wave. The duration of the saw-tooth wave form produced by generator 85 will vary directly with the length of the rectangular pulse output of saw-tooth gate 82. Therefore, the longer the time allowed for the generation of the saw-tooth wave, the higher will be the peak amplitude thereof. Thus, it may be seen that the peak amplitude of the saw-tooth wave will vary as a function of the amplitude of the input signal from amplifier 80 and the wave output of the function synthesizer 11. In order to insure complete discharge of the saw-tooth generator following each wave to thereby insure a fixed zero level, an output from square wave amplifier 83 is fed through a differentiator 86 to trigger a blocking oscillator 87, which produces a pulse of short duration, for example, one or two microseconds, which is applied through a D. C. restorer 88, which may be, for example, a diode, to saw-tooth generator 85 following the termination of each saw-tooth wave, thereby insuring the return of saw-tooth generator 85 to its zero position prior to the initiation of the generation of the following saw-tooth wave.

The output of saw-tooth generator 85 is fed through a cathode follower 89 having a peak riding circuit in its output. Peak riding circuit comprises a capacitor and resistor in series in the cathode circuit of the cathode follower 89. Across the capacitor and resistor is placed a discharge device which is periodically rendered active to discharge the capacitor in the following manner. An output from square wave amplifier 83 is fed to a recovery gate 90 comprising a delay multivibrator such that the tube across the cathode circuit of cathode follower 89 is made conductive a short time before the initiation of the saw-tooth generator 85, thereby rapidly discharging the peak riding cathode follower for a very short period, for example, one microsecond. Thus, it may be seen that, when saw-tooth generator 85 is triggered and generates a saw-tooth wave, the cathode circuit of the cathode follower 89 will develop a voltage which rises until the saw-tooth generator 85 is shut off and will remain at this level until the start of the next sampling cycle. At this time, a pulse applied to the shunt tube across the cathode circuit from square wave amplifier 83 and recovery gate 90 will discharge the peak riding circuit, thereby conditioning it for reception of the next amplitude of the saw-tooth wave. The output of cathode follower 89 is fed to a filter 91 which smoothes over the transients caused by the periodic discharges of the peak riding capacitor by the recovery gate. The output of filter 91 is fed to the horizontal deflection plates 56 of a cathode ray tube 57 similar to that of Fig. 2. Positioned adjacent the screen of cathode ray tube 57 is a film 59 supported on reels 60 and 61 and driven by a motor 62 similar to that of Fig. 2. In this system, the electron beam continuously strikes the screen, and, as the film moves past the face of the screen, a continuous trace is recorded thereon depending upon the position of the spot on the screen of tube 57. It may be seen that the time in the sampling cycle at which the coincidence gate produces a pulse may be adjusted for any particular amplitude of input data by adjusting the cathode potentiometer of the function synthesizer 11 producing the output pulse which arrives at the coincidence gate 79 at the particular time required to open the gate. Thus, for a particular amplitude of input signal to amplifier 80, the position of the spot on the screen of tube 57 may be adjusted by adjusting said potentiometer. Each potentiometer, therefore, may be adjusted to adjust the position of the spot on the screen when that spot falls within the particular area of the cathode ray screen controlled by that potentiometer. For example, the horizontal line on which the spot on the screen of tube 57 will always lie is divided into substantially twenty equal sections, each section being controlled by a potentiometer in the cathode follower circuits of the function synthesizer 11. If the input signal varies at a rate of, for example, 100 cycles per second, each cycle will be sampled substantially fourteen times by the correcting system, and, due to the action of filters 69 and 91, the portions of the signal in between the fourteen sampling positions, will be interpolated and smoothed to approximate the accurate positions.

Thus, it may be seen that this invention discloses a device whereby any information may be converted into electrical signals, and these signals may be corrected or modified in any desired manner by merely adjusting the settings of the function synthesizer 11. In actual practice, a multiplicity of potentiometers are provided for each cathode follower of the function synthesizer 11, and a gang switch shifts operation from one set of potentiometers to another so that several sets of calibrations may be set up at one time, and calibration may be shifted from one set to another by means of the switch. Thus, information coming from different sources, for example, a pressure gauge, and then a temperature gauge with each having different non-linearities, may be successively corrected by the system by simply having the calibration curve for the pressure measuring device set up on one set of potentiometers, and the calibration curve for the temperature measuring device set up on another set of potentiometers. When it is desired to record pressure information, a switch is set to connect the first set of potentiometers, and, when it is desired to record temperature information, the switch is set to connect the second set of potentiometers. It should be understood that this correcting device is actually an analogue computer which will continuously compute information according to a curve which may represent an exceedingly complex equation.

This completes the description of the particular modifications of the invention illustrated herein. However, many modifications thereof will be apparent to persons skilled in the art. For example, the function synthesizer 11 could be used in other systems besides telemetering systems and could use other delay means in place of the delay line shown. For example, a line of pulse generating tubes which were successively triggered by pulses from preceding tubes could be used. Therefore, applicant does not wish to be limited to the particular details of the invention illustrated herein except as defined by the appended claims.

What is claimed is:

1. An electron discharge device comprising a plurality of signal translation channels, said channels having different substantially constant signal amplification factors, a source of periodic pulses, and signal delay means for connecting each of said channels to said source, said delay means producing a delay between one of said channels and said source which differs from the delay between said source and an adjacent channel by substantially the duration of a pulse from said source.

2. An electron discharge device comprising a source of intelligence signals, a source of predetermined signal calibration waves, and means for modifying said intelligence signals in conformance with said calibration waves as a non-linear function of the intelligence of said intelligence signals.

3. An electron discharge device comprising a source of intelligence signals, a source of predetermined signal calibration waves, and means for modifying said intelligence signals as a predetermined non-linear function of the intelligence of said signals, said function being determined from said calibration waves, and remaining fixed with respect to time.

4. An electron discharge device comprising a source of intelligence signals, a source of predetermined signal calibration waves, and means for modifying said intelligence signals as a predetermined non-linear function of the intelligence of said signals, said function being determined from said calibration waves.

5. An electron discharge device comprising means for receiving pulse position modulated intelligence signals, means for synchronizing the generation of a calibration wave with a predetermined phase position of a cycle of pulses of said intelligence signals, and means for comparing said calibration wave with said intelligence signals.

6. An electron discharge device comprising means for receiving pulse position modulated intelligence signals, means for synchronizing the generation of a calibration wave with a predetermined phase position of a cycle of pulses of said intelligence signals, and means for comparing said calibration wave with said intelligence signals comprising a cathode ray tube.

7. An electron discharge device comprising means for receiving pulse position modulated intelligence signals, means for synchronizing the generation of a calibration wave with a predetermined phase position of a cycle of pulses of said intelligence signals, and means for comparing said calibration wave with said intelligence signals comprising a cathode ray tube whose electron beam position is determined by a signal comprising said calibration wave.

8. An electron discharge device comprising means for receiving pulse position modulated intelligence signals, means for synchronizing the generation of a calibration wave with a predetermined phase position of a cycle of pulses of said intelligence signals, and means for comparing said calibration wave with said intelligence signals comprising a cathode ray tube whose electron beam position is controlled as a function of said calibration wave and whose electron beam intensity is controlled as a function of said intelligence signals.

9. An electron discharge device comprising means for receiving continuous wave intelligence signals, means for cyclically sampling said intelligence signals, and means for synchronizing the generation of a calibration wave with said cyclical sampling means.

10. An electron discharge device comprising means for receiving continuous wave intelligence signals, means for cyclically measuring said intelligence signals, means for synchronizing the generation of a calibration wave with said cyclical measuring means, and means for comparing said calibration wave with said intelligence signals.

11. An electron discharge device comprising means for receiving continuous wave intelligence signals, a source of predetermined signal calibration waves, means for comparing said calibration waves with said intelligence signals comprising means for cyclically sampling said intelligence signals, and means for modifying said intelligence signals in conformance with said calibration waves as a function of the intelligence of said intelligence signals.

References Cited in the file of this patent

UNITED STATES PATENTS

| Number | Name | Date |
|---|---|---|
| 2,145,332 | Bedford | Jan. 31, 1939 |
| 2,195,864 | Knoop | Apr. 2, 1940 |
| 2,426,225 | Krause | Aug. 26, 1947 |
| 2,437,707 | Pierce | Mar. 16, 1948 |
| 2,451,044 | Pierce | Oct. 12, 1948 |
| 2,462,111 | Levy | Feb. 22, 1949 |
| 2,471,253 | Toulon | May 24, 1949 |
| 2,480,837 | Busignies | Sept. 6, 1949 |
| 2,497,411 | Krumhansl | Feb. 14, 1950 |
| 2,580,421 | Guanella | Jan. 1, 1952 |